United States Patent [19]

Rebish et al.

[11] 4,322,195

[45] Mar. 30, 1982

[54] LUG NUT

[75] Inventors: Edward J. Rebish, Euclid; Terry D. Capuano, Hinckley; John L. Barkocy, Hudson, all of Ohio

[73] Assignee: Russell, Burdsall & Ward Corporation, Mentor, Ohio

[21] Appl. No.: 71,567

[22] Filed: Aug. 31, 1979

[51] Int. Cl.³ .............................................. F16B 37/14
[52] U.S. Cl. ...................................... 411/431; 10/86 C
[58] Field of Search ................... 85/35, 53, 55, 9 R; 10/86 C; DIG. 8/397; 411/431, 429, 373, 377

[56] References Cited

U.S. PATENT DOCUMENTS

| | | | |
|---|---|---|---|
| Re. 30,121 | 10/1979 | Chaivre | 85/35 |
| 120,004 | 10/1871 | Skineer | 85/35 |
| D. 207,181 | 3/1967 | Mackie et al. | D8/397 |
| D. 208,428 | 8/1967 | Holliday | D8/397 |
| D. 208,429 | 8/1967 | Holliday | D8/397 |
| D. 242,219 | 11/1976 | Ono | DIG. 8/397 |
| D. 252,184 | 6/1979 | Akamatsu | D8/397 |
| D. 252,185 | 6/1979 | Akamatsu | D8/397 |
| 372,957 | 11/1887 | Bradley | 85/35 |
| 379,214 | 3/1888 | Firth et al. | 10/86 C |
| 396,865 | 1/1889 | Firth et al. | 85/35 |
| 1,109,347 | 9/1914 | McIntyre | 85/32 R |
| 1,632,991 | 6/1927 | Booth | 85/35 |
| 1,646,867 | 10/1927 | Nelson | 85/9 R X |
| 1,787,154 | 12/1930 | Hughes | 85/35 |
| 2,109,035 | 2/1938 | Schafer | 85/35 X |
| 2,220,389 | 11/1940 | Berg | 85/53 X |
| 2,252,194 | 8/1941 | Mills | 85/35 X |
| 2,275,073 | 3/1942 | Buehner | 85/35 X |
| 2,363,665 | 11/1944 | George | 85/45 X |
| 2,826,631 | 3/1958 | Rohe | 174/138 |
| 2,934,480 | 4/1960 | Slomin | 85/1 C X |
| 3,078,754 | 2/1963 | Delacy | 85/45 |
| 3,222,976 | 12/1965 | Holman | 85/35 X |
| 3,299,933 | 1/1967 | Akashi | 85/35 X |
| 3,364,806 | 1/1968 | Chaivre | 85/35 |
| 3,585,900 | 6/1971 | Chaivre | 85/35 |
| 3,971,289 | 7/1976 | Chaivre | 85/35 |
| 4,158,251 | 6/1979 | Howell | 85/55 X |

Primary Examiner—Ramon S. Britts
Attorney, Agent, or Firm—Pearne, Gordon, Sessions, McCoy & Granger

[57] ABSTRACT

Disclosed is a lug nut 10 capable of manufacture on existing nut forming machinery having a continuous thread through the entire axially inner surface 12 while having suitable drive means placed upon the axially outer surface 14 such as a conventional hex 16. The lug nut 10 has a conical bottom section 18 for tight engagement and centering of a vehicle wheel upon a vehicle and an integrally formed flange 20 at the other end thereof along with seat 26 for acceptance of an insert 28 in tight engagement therewith. The insert 28 can have a highly reflective surface 32 to provide a safety feature for night time driving.

10 Claims, 5 Drawing Figures

LUG NUT

BACKGROUND OF THE INVENTION

1. Field of the Invention

The present invention generally relates to the field of fasteners generally used to fasten the wheels of a vehicle to the axle hubs so as to provide an encasement of the threads of the studs thus protecting the studs against corrosive atmospheres. More particularly the present invention employs a reflective surface in the end of the lug nut to provide a safety feature which allows a vehicle to be easily seen from the side in the dark. Additionally, this lug nut provides a pleasing appearance to the vehicle.

2. Description of the Prior Art

There is available today a large variety of fastening means for fastening a vehicle wheel to the axle hubs in particularly by use of a standard nut with a conical bottom section thereon for centering the wheel on the studs to provide a centered wheel on the axle hub. Most of these lug nuts are of a standard variety and allow a portion of the threaded stud to protrude through the end thereof so as to assure by visual inspection the tight engagement of the lug nut against the wheel on the threaded stud. This has been permissible since generally a hub cap is utilized to cover the central portion of the vehicle wheel to provide the environmental protection necessary to prevent substantial corrosion or wear of the threaded portions of the studs which makes removal of the lug nut very difficult.

Since in some instances the hub cap is undesirable with regard to visual aesthetics, weight which requires more energy to propel and from a safety standpoint of retention of the hub cap on the automobile wheel, decorative wheels are now being utilized which do not employ the use of a hub cap. With the use of such a wheel, it has become necessary to find an alternative method of providing environmental protection for the stud. The capped lug nut is an alternate form of protecting the stud on the wheel hub. Many of these prior existing decorative lug nuts are tapped from one side only using a blind hole from the other end thus causing a manufacturing difficulty since these lug nuts must be machined instead of being formed. These lug nuts can only be tapped from one end such that the tap must be backed out causing a higher incidence of tap breakage. This tapping method is much slower than the conventional thru tapping operation which is usual practice today.

Furthermore, the capped lug nut of necessity is longer than was previously utilized since a space is needed for the tapping chips and the taps utilized to thread such lug nuts are unable to provide a clean full thread to the end of the lug nut. The lug nut must have enough full threads to assure the wheel is securely tightened before stud thread bottoms out.

Another type of axle nut or capping axle nut utilizes a fully threaded nut having a flange and seat at one end thereof so as to accept a suitably fashioned end cap which is placed within the confines of the flange. The flange of the lug nut is then crimped or otherwise machined over the end cap. This type of an arrangement necessitates the use of an additional manufacturing step of closing of the flange over the end cap and tends to come loose after the lug nut has been removed and tightened in service.

Another approach is to use a standard lug nut and then laminate it with a cover of polished stainless steel to provide decorative effect and a means of holding an end cap firmly in place over an end of the lug nut. This approach also necessitates the use of extra manufacturing steps all of which added to the cost of the resulting lug nut. Also it tends to come loose after the lug nut has been removed and tightened in service.

Therefore, it would be exceedingly advantageous in terms of reducing manufacturing costs to provide a fully threaded lug nut having a capping arrangement that requires little or no extra manufacturing in terms of additional costs.

SUMMARY OF THE INVENTION

Accordingly, it is an object of the present invention to provide a lug nut of shortened length so as to save on the manufacturing and material costs of such a lug nut.

It is another object of the present invention to provide a lug nut which can be conveniently manufactured on standard nut making machinery so as to provide the least capital investment cost in the production of such a product.

It is a further object of the present invention to provide a lug nut with an integrally formed flange and seat to provide for a snap in decorative reflecting surface in place.

These and other objects of the present invention, together with the advantages thereof over existing and prior art forms, will become apparent to those skilled in the art from the following specification.

It has been found that a lug nut can comprise a nut having axially inner and outer surfaces; the axially inner surface having a thread continuously through the entire axially inner surface; the axially outer surface having a suitable driver means; at one end of the axially outer surface, a conical bottom section for tight engagement of a wheel to a vehicle axle hub; at axially the opposite end of the conical bottom section, an integrally formed flange conically sloped toward the axially inner surface having a bore diameter at the small conjugate plane thereof greater than the groove diameter of the thread of the axially inner surface; an insert seat extending from the inner surface of the large conjugate plane of the flange to the axially inner surface; and an insert having a flexible slightly conical flange to snap fit into the integrally formed flange of the nut so as to stop upon the seat in tight engagement.

DESCRIPTION OF THE PREFERRED EMBODIMENTS

Figure 1:
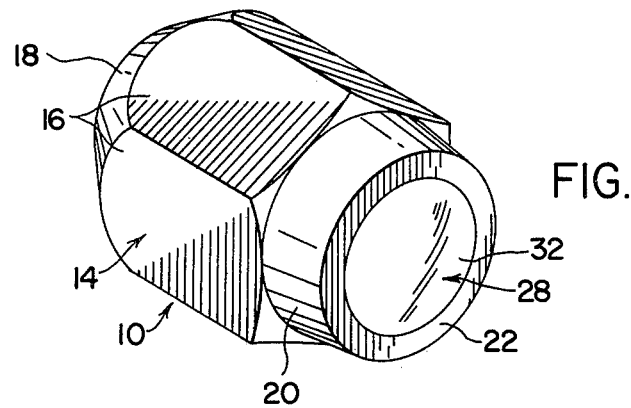
FIG. 1 is a perspective view of the lug nut having a standard hex drive means and a reflecting insert cap.
Figure 2:
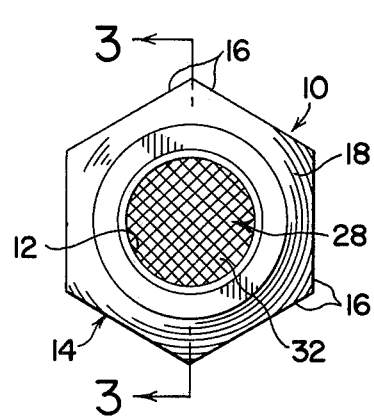
FIG. 2 is a bottom elevation view of the lug nut showing the reflector inserted into the crown of the lug nut.

As can be seen in FIG. 1 of the drawings, lug nut 10 of the improved construction can generally be made of any material which is cold formable in conventional nut forming equipment such as low carbon steel or aluminum. For decorative effect, one could chrome plate the lug nut 10, coat it with any of a number of available polymeric materials, make it out of a stainless steel or plate it with zinc or cadmium. The nut itself has an axially inner surface numeral 12 and an axially outer surface numeral 14 as seen in the drawings. The axially inner surface 12 of the lug nut 10 will have a conventional thread design which is conveniently matching to that of the stud or bolt or like member for which the lug nut is to be engaged by the threads. One example of a thread which is utilized on many studs and lug nuts is a 12 mm. (½-20) type thread.

The present invention uses an axially inner surface 12 which is completely open throughout the entire length of the lug nut 10 such that the manufacture and threading of the lug nut 10 can be accomplished on conventional nut forming equipment to provide a thread surface to the full depth of the thread throughout the entire length of the axially inner surface 12 of the lug nut 10. This also provides the ability to shorten the lug nut 10 thus achieving considerable material savings in the manufacture of such a lug nut since the threads are to the full depth throughout the entire length of the axially inner surface 12.

Figure 4:
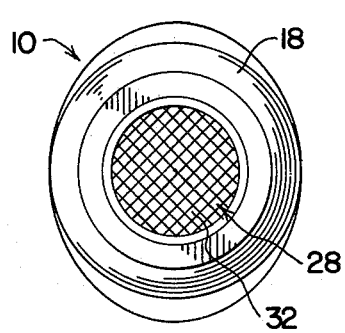
FIG. 4 is a bottom elevation view of the lug nut having an alternative drive means.

The axially outer surface 14 of the lug nut 10 as reflected by a major portion of the total length of lug nut 10, is fashioned or manufactured into a suitable driver means for threaderably engaging and disengaging the lug nut 10 from the appropriate stud or the like not shown in the drawings. This may take the form of a standard hex configuration providing a plurality of planar angularly disposed adjoining surfaces 16 adapted for the engagement of a socket wrench or the like for tightening or loosening the lug nut 10 or some other anti-theft configuration such as shown in FIG. 4 utilizing an eliptical configuration suitable for engagement by a specially designed wrench for tightening or loosening the lug nut 10. FIG. 4 is only one example of many known anti-theft configurations for nuts or bolts which require specially designed sockets or wrenches for tightening or loosening the nuts or bolts. Thus those skilled in the art can readily provide a number of anti-theft configurations which would meet the suited purpose of the present invention.

Figure 3:
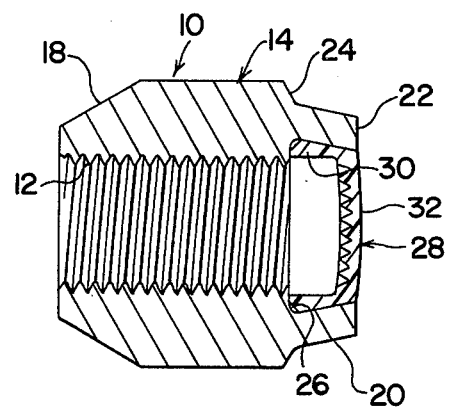
FIG. 3 is a section view of the lug nut taken along lines 3—3 of FIG. 2.

At one end of the axially outer surface 14 as can be amply seen in FIGS. 1 and 3, is a conical bottom section 18 which is designed to mate with a similar conical section formed in the wheel or member being locked into place. Furthermore the conical bottom section 18 is also used as a centering device to assure that the wheel as secured to the axle is in a centered position thus allowing free rotation in a balanced configuration.

The opposite end axially of the conical bottom section 18 is an integrally formed flange 20 as best seen in FIGS. 1 and 3 of the drawings which also is a conically shaped section sloping toward the axially inner surface 12. The integrally formed flange 20 is formed such that the small conjugate plane 22 of the conical section has an inside or bore diameter greater than that of the groove diameter of the threads on the axially inner surface 12. This is important from a manufacturing standpoint since an object of the present invention is to allow the subject lug nut 10 to be manufactured on standard nut manufacturing equipment thus clearance of the integrally formed flange 20 is necessary to allow complete threading of the axially inner surface 12 through its entire length without interference.

Since the groove diameter of the threads in the axially inner surface 12 is smaller than the inside diameter of the small conjugate plane 22, the large conjugate plane 24 of the conical section provides a seat 26 at the top of the threads within the axially inner surface 12. This seat provides a stop or resting place for the insert 28 which is to be placed in the end or crown of the lug nut 10.

Insert 28 has a circumferential flexible slightly conical flange 30 attached thereto so as to allow it to be snapped into the integrally formed flange 20. The circumferential flexible slightly conical flange 30 must have sufficient flexibility and sufficient structural integrity to allow compression fitting of the insert 28 into the integrally formed flange 20 so as to rest firmly upon the seat 26 in sealing engagement. The insert surface 32 can be utilized for appearance in a decorative fashion or more preferably have suitably placed thereupon a reflective surface so as to provide a safety device. The insert 28 may be manufactured from any convenient material like polymeric materials such as polyurethane, nylon, polyethylene, polystyrene, polypropylene, and others.

The use of this lug nut 10 with a highly reflective surface 32 on the insert 28 when utilized to secure the wheel to an automobile, will provide an added safety feature in terms of visual effect upon on-coming drivers when driving during periods of darkness. Furthermore the lug nut 10 can have the axially outer surface 14 decoratively adorned to provide an aesthetically pleasing surface finish such as that which would be caused by plating either with chrome, nickel or other suitable material, or having a brushed effect as would brushed stainless steel. Furthermore because the insert 28 is compression fitted into the integrally formed flange 20, the lug nut 10 can easily be suitably finished prior to the final assembly step for sale as a product. This provides manufacturing convenience and manufacturing cost savings in addition to the safety effect provided when used with a reflective surface on the insert surface 32.

Figure 5:
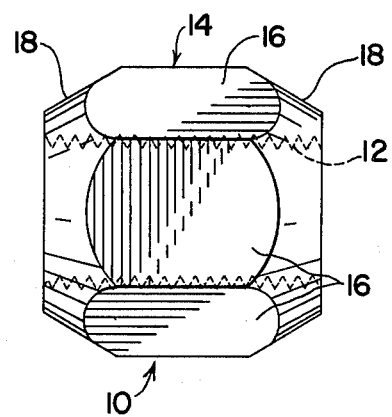
FIG. 5 is a side elevation view of an alternative embodiment having dual conical bottom sections.

An alternative embodiment can be seen in FIG. 5 wherein it can be seen that the integrally formed flange 20 may have an exterior shape the same as the conical bottom section 18 such that if the insert 28 were removed and the lug nut 10 mistakenly turned end for end in fastening a wheel to the vehicle, there would be conical bottom sections 18 on each end to allow proper engagement of the wheel in any event. This provides an added safety feature in that the wheel can't be put onto the vehicle in an unsafe manner. Furthermore, as seen in FIG. 5, the axially inner surface 12 can be continuously threaded through the entire length of the lug nut 10 to accept an insert 28.

Thus, it is apparent to those skilled in the art from the foregoing description and drawings presented that the present disclosure of an improved lug nut has been provided which will accomplish the objects of the invention.

What is claimed is:

1. A lug nut comprising: a nut having a body providing axially inner and outer surfaces, said axially inner surface having a thread continuously through the entire inner surface, said axially outer surface having a suitable drive means; at one end of said axially outer surface, a conical bottom section for tight engagement of a wheel to a vehicle axle hub; at axially the opposite end from said conical bottom section, said body providing a preformed axially extending insert receiving surface extending to a remote open end with a diameter greater than the groove diameter of said thread of said axial inner surface; an insert seat extending from said insert receiving surface to said axial inner surface; and an insert positioned within said insert surface having an end wall extending across said open end and an axially extending slightly conical integral flange, said insert having an unstressed diameter greater than the diameter of said open end, said insert being radially deflectable to a diameter at least as small as said open end of said body flange allowing said insert to pass through said open end, said insert having sufficient elastic memory to cause it to fit within said insert surface and against said seat with a tight fit.

2. A lug nut according to claim 1 wherein said insert is made of a slightly flexible polymeric material.

3. A lug nut according to claim 2 wherein said insert has a decorative outer surface.

4. A lug nut according to claim 1 wherein said axially outer surface has an aesthetically pleasing surface finish.

5. A lug nut according to claim 4 wherein said aesthetically pleasing surface finish is brushed stainless steel.

6. A lug nut according to claim 4 wherein said aesthetically pleasing surface is an electroplated surface.

7. A lug nut according to claim 4 wherein said aesthetically pleasing surface is a polymeric material.

8. A lug nut as set forth in claim 9, wherein said insert flange has an inner wall having a diameter at least as great as said groove diameter of said thread, whereby a lug extending past said thread to a location within said flange does not produce significant contact with said insert flange.

9. A lug nut as set forth in claim 1, wherein said body extends to a location substantially flush with the outer surface of said insert end wall.

10. A lug nut comprising: a nut having a body providing axially inner and outer surfaces, said axially inner surface having a thread continuously through the entire inner surface, said axially outer surface having a suitable drive means; at one end of said axially outer surface, a conical bottom section for tight engagement of a wheel to a vehicle axle hub; at axially the opposite end from said conical bottom section, said body providing a preformed conical inner surface sloping radially inwardly to a remote open end with a diameter greater than the groove diameter of said thread of said axial inner surface; an insert seat extending from said conical inner surface to said axial inner surface; and an insert positioned within said conical inner surface having an end wall extending across said open end and an axially extending slightly conical integral flange, said insert flange having an unstressed diameter at its edge remote from said wall greater than the diameter of said open end, said insert flange being radially deflectable at said edge to a diameter at least as small as said open end of said body flange allowing said insert flange to pass through said open end, said insert flange having sufficient elastic memory to cause it to fit within said body conical inner surface and against said seat with a tight fit.

* * * * *